United States Patent
Stratton et al.

(10) Patent No.: US 9,004,016 B2
(45) Date of Patent: Apr. 14, 2015

(54) DOG VEST WITH INTEGRATED FLEXIBLE BUMPER

(71) Applicants: Dorie Stratton, Blairsville, GA (US); Ellen Burgess, Blairsville, GA (US)

(72) Inventors: Dorie Stratton, Blairsville, GA (US); Ellen Burgess, Blairsville, GA (US)

( * ) Notice: Subject to any disclaimer, the term of this patent is extended or adjusted under 35 U.S.C. 154(b) by 44 days.

(21) Appl. No.: 13/923,341

(22) Filed: Jun. 20, 2013

(65) Prior Publication Data

US 2014/0069351 A1 Mar. 13, 2014

Related U.S. Application Data

(60) Provisional application No. 61/700,188, filed on Sep. 12, 2012.

(51) Int. Cl.
- *A01K 15/02* (2006.01)
- *A01K 13/00* (2006.01)
- *A01K 15/00* (2006.01)
- *A01K 27/00* (2006.01)

(52) U.S. Cl.
CPC ............ *A01K 13/006* (2013.01); *A01K 15/00* (2013.01); *A01K 27/002* (2013.01)

(58) Field of Classification Search
USPC .......... 119/850, 837, 766, 856, 815, 832, 836
See application file for complete search history.

(56) References Cited

U.S. PATENT DOCUMENTS

| | | | |
|---|---|---|---|
| 2,513,969 A * | 7/1950 | Rose et al. | 119/850 |
| 6,367,424 B1 * | 4/2002 | Higham | 119/850 |
| 8,413,670 B1 * | 4/2013 | Richardson, Jr. | 135/16 |
| D683,913 S * | 6/2013 | Bordeaux | D30/145 |
| 8,707,909 B2 * | 4/2014 | Bordeaux | 119/850 |
| 2005/0263101 A1 * | 12/2005 | Jenny et al. | 119/792 |
| 2006/0278177 A1 * | 12/2006 | Crawford | 119/850 |

* cited by examiner

*Primary Examiner* — Yvonne Abbott-Lewis

(57) ABSTRACT

A vest can be worn by a visually impaired pet, such as a dog, to help the pet navigate without hurting themselves by bumping into walls or objects. The vest includes plastic tubing with wire woven therein. The tubing is shaped like a halo that surrounds the front and sides of the pet's head. Should the visually impaired pet run into an object or wall, the halo will hit before their head hits and the pet will turn away before injuring themselves. The vest can be worn about their torso with their front legs fitting in leg holes of the vest. The vest can be adjustable to fit a range of pet sizes. The halo can also be adjustable to provide safe navigation of the pet. Typically, the vest is designed for dogs, but other visually impaired pets or animals may benefit by using the vest.

10 Claims, 4 Drawing Sheets

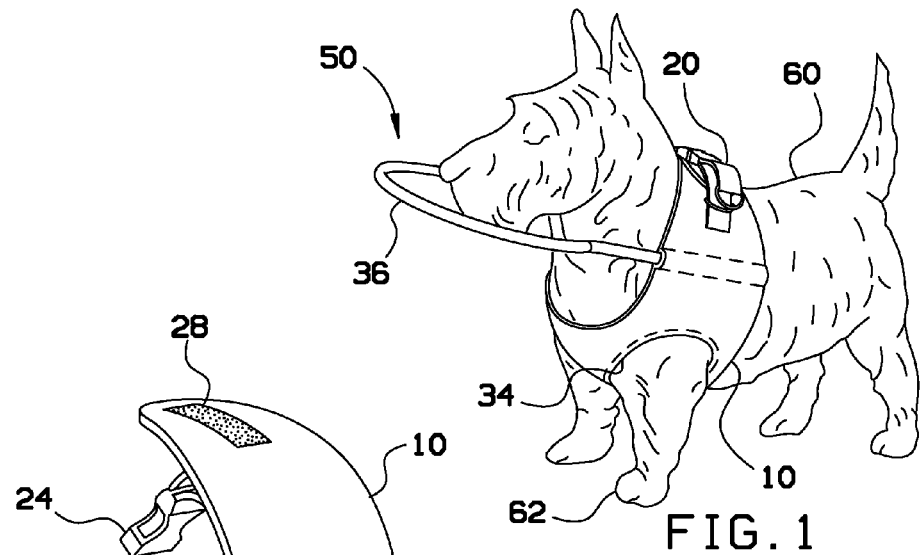
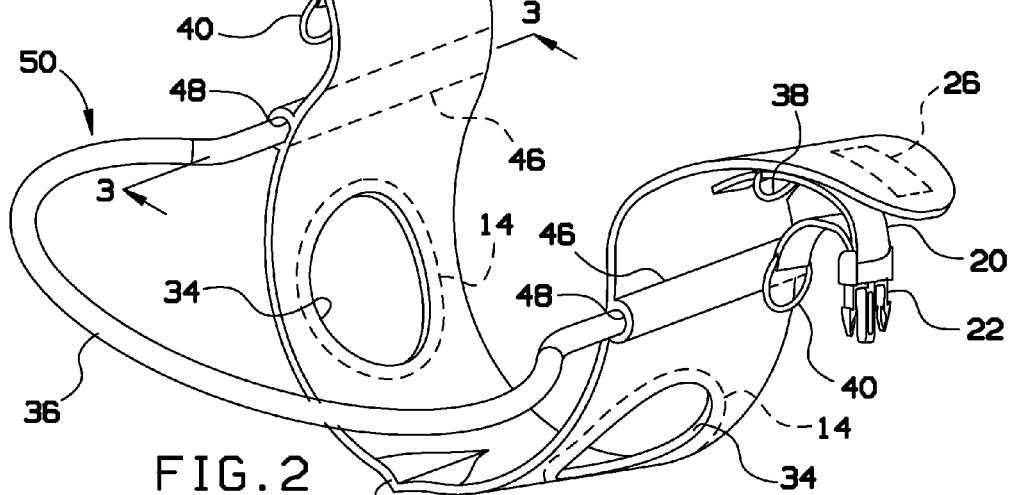
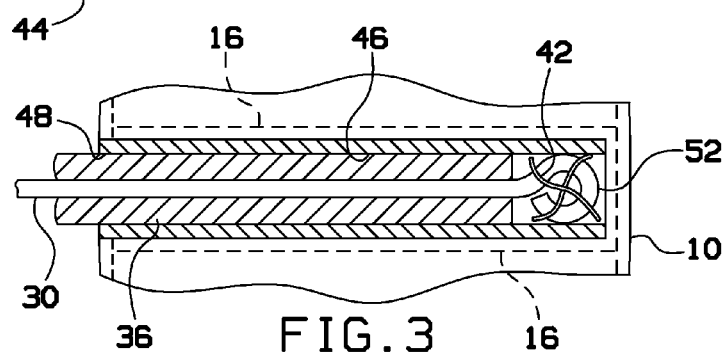

DOG VEST WITH INTEGRATED FLEXIBLE BUMPER

CROSS-REFERENCE TO RELATED APPLICATION

This application claims the benefit of priority of U.S. provisional application No. 61/700,188, filed Sep. 12, 2012, the contents of which are herein incorporated by reference.

BACKGROUND OF THE INVENTION

The present invention relates to pet accessories and, more particularly, to a dog vest with an integrated flexible bumper to aid visually impaired dogs and prevent the dog from injuring themselves by alerting the dog of walls or objects in their path.

There are many visually impaired and blind dogs. Typically, these dogs do not move around much and can suffer from a lower quality of life due to fear of bumping into objects, walls or the like. Moreover, many owners of visually impaired dogs cannot move furniture or place objects in various locations, as their dogs often have set paths that they know are safe. If they run into an unexpected object in this path, the visually impaired dog may be fearful of even traveling along their usual path.

Very little is currently done to help such animals. Many pet owners use a collar and leash to help guide their visually impaired dog to lead them outdoors, to other locations, and the like.

As can be seen, there is a need for a device that can give a visually impaired dog the confidence to navigate without fear of injuring themselves by bumping into objects or walls.

SUMMARY OF THE INVENTION

In one aspect of the present invention, a dog vest comprises a vest body; first and second front leg holes formed in the vest body; at least one attachment mechanism disposed at ends of the vest body, the at least one attachment mechanism operable to secure the vest body around a dog's body, attaching at a top location thereof; first and second tubing channels attached to opposite sides of the vest body; tubing extending from the tubing channels, the tubing extending beyond a dog's head when the dog vest is worn by a dog; a first wire extending from the first tubing channel and terminating inside the tubing; and a second sire extending from the second tubing channel and terminating inside the tubing, wherein the first and second wires are secured to the vest body inside the tubing channels.

In another aspect of the present invention, a dog vest comprises a vest body; first and second front leg holes formed in the vest body; hook and loop fasteners disposed at ends of the vest body, the hook and loop fasteners operable to secure the vest body around a dog's body, attaching at a top location thereof; first and second straps attached to each end of the vest body, the first strap having a male connector and the second strap having a female connector, the male and female connectors attaching together to secure the dog vest to the dog; first and second tubing channels attached to opposite sides of the vest body; tubing adjustably extending from the tubing channels, the tubing extending beyond a dog's head when the dog vest is worn by a dog; a first wire extending from the first tubing channel and terminating inside the tubing; and a second wire extending from the second tubing channel and terminating inside the tubing, wherein the first and second wires are secured to the vest body inside the tubing channels.

These and other features, aspects and advantages of the present invention will become better understood with reference to the following drawings, description and claims.

BRIEF DESCRIPTION OF THE DRAWINGS

FIG. 1 is a perspective view of a dog vest, in use, according to an exemplary embodiment of the present invention;

FIG. 2 is a perspective view of the dog vest of FIG. 1, removed from the dog, in an open configuration;

FIG. 3 is a cross-sectional view taken along line 3-3 of FIG. 2;

DETAILED DESCRIPTION OF THE INVENTION

Figure 4:
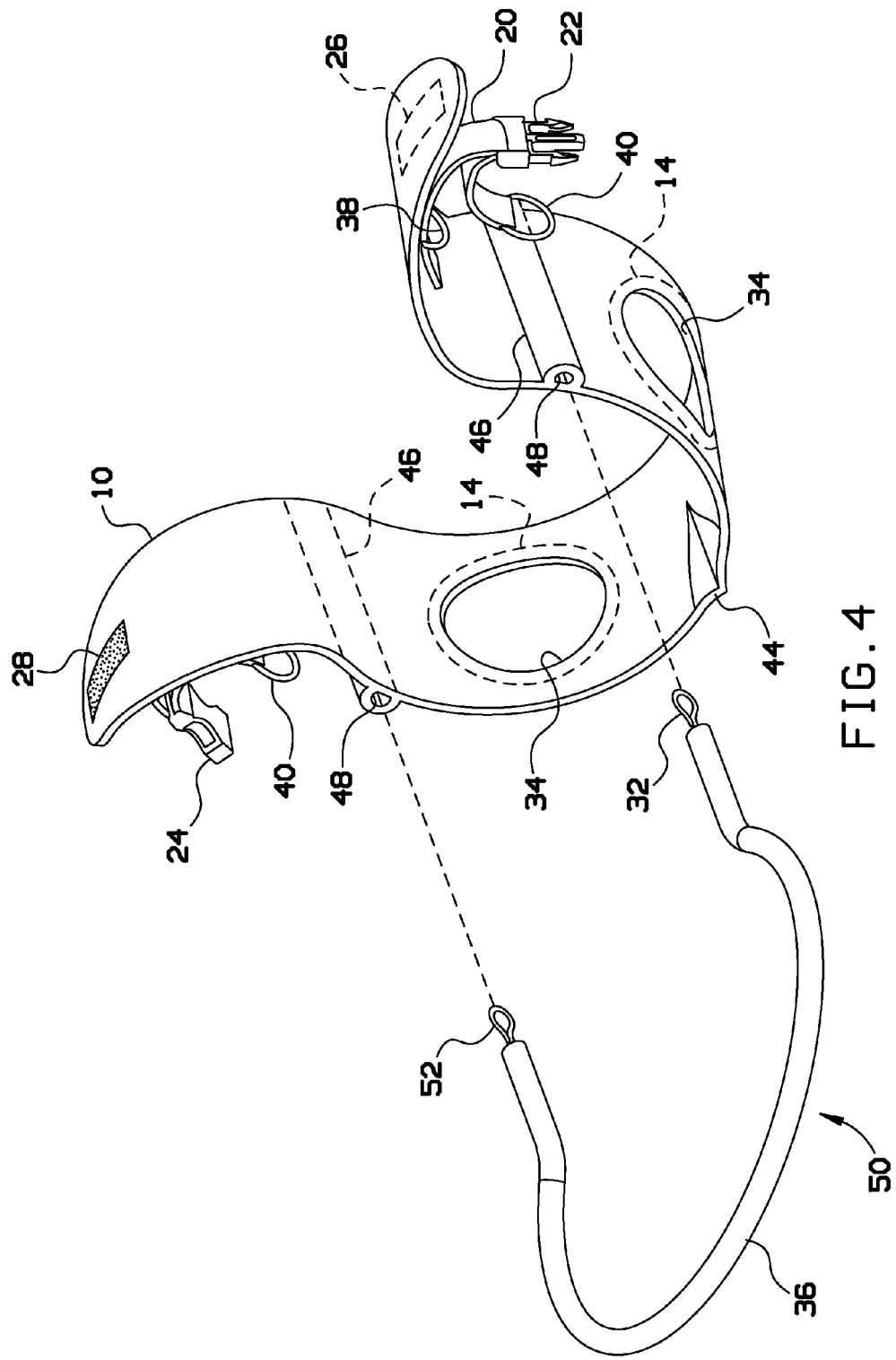
FIG. 4 is an exploded perspective view of the dog vest of FIG. 2.
Figure 5:
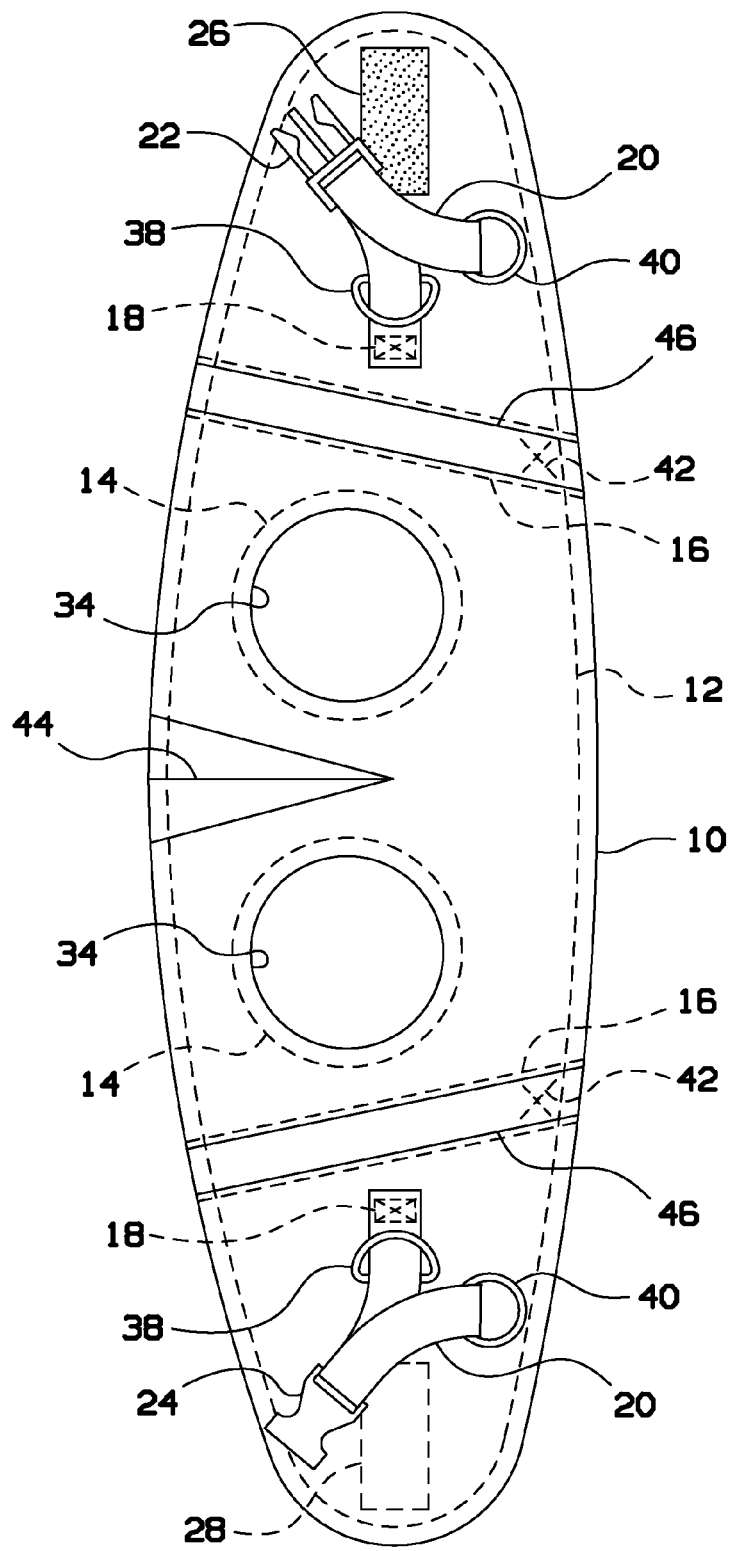
FIG. 5 is a bottom, flattened view of the dog vest of FIG. 2.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a vest that can be worn by a visually impaired pet, such as a dog, to help the pet navigate without hurting themselves by bumping into walls or objects. The vest includes plastic tubing with wire woven therein. The tubing is shaped like a halo that surrounds the front and sides of the pet's head. Should the visually impaired pet run into an object or wall, the halo will hit before their head hits and the pet will turn away before injuring themselves. The vest can be worn about their torso with their front legs fitting in leg holes of the vest. The vest can be adjustable to fit a range of pet sizes. The halo can also be adjustable to provide safe navigation of the pet. Typically, the vest is designed for dogs, but other visually impaired pets or animals may benefit by using the vest.

Referring now to FIGS. 1 through 6, a dog vest can include a cloth or lined material body 10 having two leg openings 34 adapted to receive the front legs 62 of a dog 60. Leg opening bias tape stitching 14 can be disposed about each leg opening 34 to help prevent damage to the leg openings 34.

A top portion of the vest includes a quick release fastener, such as a hook fastener 26 and a loop fastener 28 to securing the vest on the dog 60. An adjustable strap 20 can extend from each side of the top portion of the vest. In some embodiments, the straps 20 can be attached to the vest body 10 with strap stitching 18. A male buckle end 22 can be attached, via the strap 20, to one side of the top portion of the vest and a female buckle end 24 can be attached, via another strap 20, to the other side of the top portion of the vest. The buckle ends 22, 24 can be interconnected to help secure the vest to the dog 60. The straps 20 can be adjustable to provide variable sizes in a single vest. The vest can be made in various sizes, such as small, medium and large, to fit all ranges of sizes of dogs.

One or more rings, such as D-rings 38 can be attached to the vest typically and the strap 20 slides through the D-ring 38 to help hold the buckles 22, 24 snug in place when the leash is attached to the two O-rings 40 as shown in FIG. 2.

Tubing channels 46 can be disposed on each side of the vest body 10. Tubing channel openings 48 can be disposed to receive tubing 36 of the wire loop assembly 50. The tubing channels 46 can span the entire width of the vest, typically from about 2 to about 6 inches. The tubing 36 can be inserted fully into the tubing channels 46 and can be extended from about one-half of the length of the tubing channels 46 to provide one mode of adjustment of the wire loop assembly 50.

As shown in FIG. 3, the tubing channels 46 can receive the tubing 36 having a wire 30 disposed therein. The wire 30 can be made from various materials, typically flexible materials, such as metal, including galvanized wire. The wire 30 can end in a retention loop 52 that can be secured to the vest, inside the end of the tubing channels 46, with a wire loop tacking stitch 42, for example. Therefore, the wire 30 is secured inside the tubing channel 46, typically at an end opposite the tubing channel openings 48.

Figure 6:
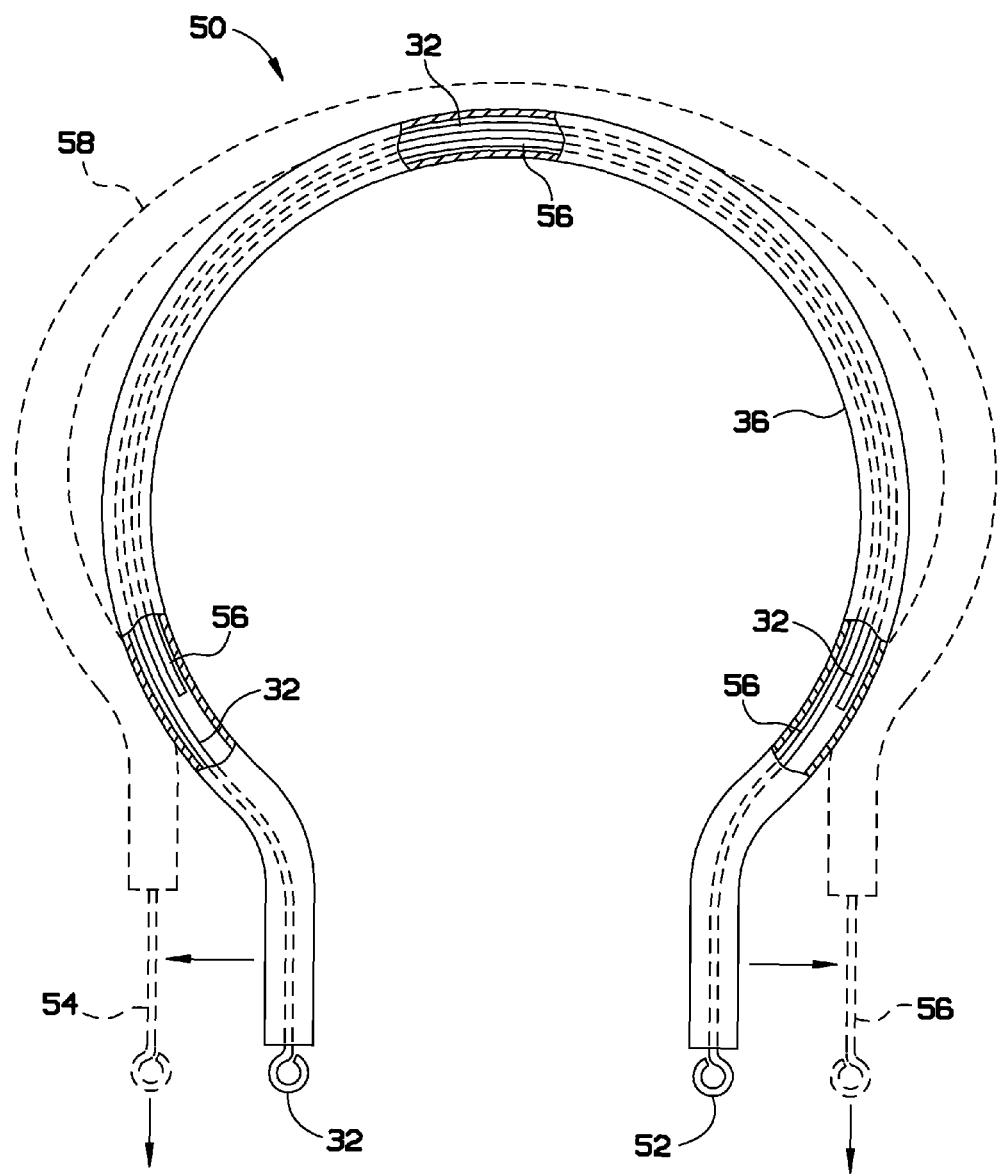
FIG. 6 is a top, partially cut-away view of a wire loop assembly of the dog vest of FIG. 2, illustrating adjustment of the wire and tubing thereof.

As illustrated in FIG. 6, the wire loop assembly 50 includes a first wire 32 and a second wire 56 extending from each of the tubing channels 46 on each side of the vest. The wires 32, 56 are extended into each end of the tubing 36 and each of the wires 32, 56 terminate before exiting the tubing 36 at an end opposite from that which the wires 32, 56 are inserted. As shown by the dotted lines 58 in FIG. 6, wires 54, 56 can be exposed from the tubing 36. To adjust the size of the wire loop assembly 50, a user can pull the tubing 36 off the wires 32, 56, cut the tubing to a desired shorter length, and reinsert the wires 32, 56. This can provide a second mode of adjustment for the wire loop assembly 50.

The vest body 10 can include a breast dart 44 to provide a comfortable fit of the vest on the dog 60. The vest can also have perimeter stitching 12 to provide a secure perimeter to the vest.

The wire 32, 56 and the tubing 36 can sturdy the wire loop assembly 50, allowing it to be support by the tubing channels 46 and be retained about the front and sides of the dog's head, as shown in FIG. 1. The position of the wire loop assembly 50 (also referred to a halo) can be changed, as desired, to extend higher or lower about the dog's head.

As discussed above, the vest of the present invention can be designed in various sizes, so that, based on various dog measurements, the vest can fit a variety of dogs. In some embodiments, the vest can be custom made to fit a desired dog, based on measurements, such as chest circumference, leg circumference, leg spacing, neck length and the like.

It should be understood, of course, that the foregoing relates to exemplary embodiments of the invention and that modifications may be made without departing from the spirit and scope of the invention as set forth in the following claims.

What is claimed is:

1. A dog vest comprising:
    a vest body;
    first and second front leg holes formed in the vest body;
    at least one attachment mechanism disposed at ends of the vest body, the at least one attachment mechanism operable to secure the vest body around a dog's body, attaching at a top location thereof;
    first and second tubing channels attached to opposite sides of the vest body;
    tubing extending from the tubing channels, the tubing extending beyond a dog's head when the dog vest is worn by a dog;
    a first wire extending from the first tubing channel and terminating inside the tubing; and
    a second wire extending from the second tubing channel and terminating inside the tubing, wherein
    the first and second wires are secured to the vest body inside the tubing channels.

2. The dog vest of claim 1, wherein the at least one attachment mechanism includes a hook and loop fastener.

3. The dog vest of claim 1, further comprising first and second straps attached to each end of the vest body, the first strap having a male connector and the second strap having a female connector, the male and female connectors attaching together to secure the dog vest to the dog.

4. The dog vest of claim 3, wherein the first and second straps are adjustable.

5. The dog vest of claim 1, further comprising at least one ring attached to the vest body.

6. The dog vest of claim 1, wherein the tubing adjustably fits inside the tubing channels, permitting extending the tubing at least a portion out of the tubing channels to adjust a length of the tubing.

7. The dog vest of claim 1, further comprising a breast dart disposed in a central region of the dog vest, between the first and second leg openings, at a front side thereof.

8. A dog vest comprising:
    a vest body;
    first and second front leg holes formed in the vest body;
    hook and loop fasteners disposed at ends of the vest body, the hook and loop fasteners operable to secure the vest body around a dog's body, attaching at a top location thereof;
    first and second straps attached to each end of the vest body, the first strap having a male connector and the second strap having a female connector, the male and female connectors attaching together to secure the dog vest to the dog;
    first and second tubing channels attached to opposite sides of the vest body;
    tubing adjustably extending from the tubing channels, the tubing extending beyond a dog's head when the dog vest is worn by a dog;
    a first wire extending from the first tubing channel and terminating inside the tubing; and
    a second wire extending from the second tubing channel and terminating inside the tubing, wherein
    the first and second wires are secured to the vest body inside the tubing channels.

9. The dog vest of claim 8, wherein the first and second straps are adjustable.

10. The dog vest of claim 8, further comprising at least one ring attached to the vest body.

* * * * *